(12) United States Patent
Forst et al.

(10) Patent No.: US 11,585,727 B2
(45) Date of Patent: Feb. 21, 2023

(54) METHOD FOR DIAGNOSING THE DYNAMICS OF A SENSOR IN THE FRESH AIR OR EXHAUST GAS TRACT OF INTERNAL COMBUSTION ENGINES

(71) Applicant: Volkswagen Aktiengesellschaft, Wolfsburg (DE)

(72) Inventors: Johannes Forst, Hannover (DE); Michael Mazur, Hannover (DE); Fabian Berski, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/459,615

(22) Filed: Aug. 27, 2021

(65) Prior Publication Data

US 2022/0065751 A1 Mar. 3, 2022

(30) Foreign Application Priority Data

Aug. 28, 2020 (DE) ...................... 10 2020 210 878.1

(51) Int. Cl.
*F01D 1/00* (2006.01)
*G01M 15/02* (2006.01)
*F01N 11/00* (2006.01)
*F02M 35/10* (2006.01)
*G01M 15/10* (2006.01)

(52) U.S. Cl.
CPC ........... *G01M 15/02* (2013.01); *F01N 11/002* (2013.01); *F02M 35/1038* (2013.01); *G01M 15/102* (2013.01)

(58) Field of Classification Search
CPC ..... G01L 23/227; G01L 23/221; G01M 15/08
See application file for complete search history.

(56) References Cited

U.S. PATENT DOCUMENTS

| 8,087,291 B2 | 1/2012 | Michalske et al. |
| 8,355,119 B2 | 1/2013 | Bergmann |
| 8,739,616 B2 | 6/2014 | Wagner et al. |

(Continued)

FOREIGN PATENT DOCUMENTS

| DE | 102007063355 A1 | 7/2009 |
| DE | 102008001121 A1 | 10/2009 |

(Continued)

*Primary Examiner* — John Kwon
(74) *Attorney, Agent, or Firm* — Muncy, Geissler, Olds & Lowe, P.C.

(57) ABSTRACT

A method for diagnosing the dynamics of a sensor in the fresh air or exhaust gas tract of internal combustion engines, as well as a computer program, a computer program product and a corresponding vehicle. It is provided that a corresponding sensor for measuring a pressure signal in the fresh air or exhaust gas tract of an internal combustion engine of a vehicle, which is coupled with a control and computing unit, is checked with respect to its dynamic characteristics. Measured values of differing frequency ranges are measured, these being used as the basis for a calculation of a characteristic. After the calculation, the characteristic is compared with a threshold value stored in a user-defined manner in the control and computing unit. If the calculated characteristic deviates from the threshold value, at least one triggering signal is triggered, so that an impaired sensor dynamic of the sensor is displayed.

14 Claims, 2 Drawing Sheets

(56) References Cited

U.S. PATENT DOCUMENTS

| | | | |
|---|---|---|---|
| 9,244,096 B2 | 1/2016 | Shi et al. | |
| 9,523,707 B2 | 12/2016 | Shi et al. | |
| 10,041,916 B2 | 8/2018 | Michalske | |
| 10,060,894 B2 | 8/2018 | Michalske | |
| 10,323,965 B2 | 6/2019 | Pedrami et al. | |
| 2006/0288767 A1* | 12/2006 | Hernandez | B60W 50/0205 73/114.12 |
| 2011/0184700 A1 | 7/2011 | Michalske et al. | |
| 2013/0090834 A1* | 4/2013 | Miyauchi | F02D 41/1456 701/103 |
| 2014/0141680 A1* | 5/2014 | Kyuno | H01T 13/60 445/3 |
| 2016/0123249 A1* | 5/2016 | Sakayanagi | G01L 23/22 701/111 |
| 2020/0200113 A1 | 6/2020 | Braun et al. | |
| 2020/0300185 A1 | 9/2020 | Braun et al. | |

FOREIGN PATENT DOCUMENTS

| | | |
|---|---|---|
| DE | 102008001579 A1 | 11/2009 |
| DE | 102008040737 A1 | 1/2010 |
| DE | 102009027400 A1 | 1/2011 |
| DE | 102011002782 B3 | 6/2012 |
| DE | 102011088296 A1 | 6/2013 |
| DE | 102012204353 A1 | 9/2013 |
| DE | 102013207202 A1 | 10/2014 |
| DE | 102017215849 A1 | 3/2019 |
| EP | 3168578 A1 | 5/2017 |
| WO | WO2009025886 A2 | 2/2009 |
| WO | WO2018220045 A1 | 12/2018 |

* cited by examiner

METHOD FOR DIAGNOSING THE DYNAMICS OF A SENSOR IN THE FRESH AIR OR EXHAUST GAS TRACT OF INTERNAL COMBUSTION ENGINES

This nonprovisional application claims priority under 35 U.S.C. § 119(a) to German Patent Application No. 10 2020 210 878.1, which was filed in Germany on Aug. 28, 2020, and which is herein incorporated by reference.

BACKGROUND OF THE INVENTION

Field of the Invention

The present invention relates to a method for diagnosing the dynamics of a sensor in the fresh air or exhaust gas tract of internal combustion engines, as well as a computer program, a computer program product and a corresponding vehicle.

Description of the Background Art

New methods, in particular camshaft adaptation via pressure pulsation, require highly dynamic sensors. If the dynamics of sensors is reduced, these new methods lose their required accuracy. For example, sensors may at least partially lose their dynamics due to aging processes or clogging processes. Defects of any kind or production faults may generally be responsible for this. In these special states, such sensor still measure measured values. However, the extent to which the required accuracy and, above all, correctness, is maintained is not readily apparent to a user or coupled devices. In particular, any first indications of such special states are often not noticed, so that methods coupled therewith may no longer be carried out reliably and flawlessly.

Initial methods are already known, which uniquely detect a signal gradient or possibly check individual FFT frequencies or orders. The use of bandpass filters also plays a role here. The fact that this procedure may be viewed as too imprecise for the desired purposes may be seen as disadvantageous. In this connection, only certain frequencies are also taken into account.

Methods known up to know for diagnosing a sensor for its dynamic characteristics thus do not offer a sufficient distinction between a dynamic sensor and a sensor having deteriorated dynamics during a use in series.

One example from the prior art is described in greater detail below.

A method for diagnosing the dynamics of exhaust gas sensors is apparent as known from the publication DE 10 2013 207 202 A1. In particular, a method for diagnosing the dynamics of sensors in the fresh air or exhaust gas tract of internal combustion engines is described, which, during their operation, induce, in particular, periodic fluctuations of at least one substance variable of the fresh aft supplied to the internal combustion engine or the exhaust gas in the exhaust gas tract. Due to the periodic fluctuations of sensor excitations and corresponding sensor responses induced in pre-definable operating ranges of the internal combustion engine are compared with stored or calculated excitations of the substance variable previously detecting for these operating ranges and/or stored or calculated associated sensor responses. At least one variable of the sensor characterizing the sensor dynamics is then extrapolated from the comparison.

SUMMARY OF THE INVENTION

It is therefore an object of the present invention to provide a method for diagnosing the dynamics of a sensor, which ensures a robust and reliable analysis of a functional capability of a sensor to be diagnosed.

In an exemplary embodiment of the invention, it is provided that a method for diagnosing the dynamics of a sensor in the fresh air or exhaust has tract of internal combustion engines is provided, which comprises the following steps: Coupling a sensor for measuring a pressure signal in the fresh air or exhaust gas tract of an internal combustion engine of a vehicle with a control and computing unit; transmitting at least one measured value of different frequency ranges in each case, collected with the aid of the sensor, to the control and computing unit, the method comprising the following further steps: Calculating a characteristic, using the measured values of differing frequency ranges; comparing the calculated characteristic with a threshold value stored in a user-defined manner in the control and computing unit; triggering at least one triggering signal if the calculated characteristic deviates from the threshold value so that an impaired sensor dynamic of the sensor is displayed.

In this way, it is possible to provide a method for diagnosing the dynamics of a sensor, which ensures a robust and reliable analysis of a functional capability of a sensor to be diagnosed.

To analyze the dynamics of the sensor, the signal recorded upon a suitable excitation is analyzed over certain time frames in milliseconds or corresponding engine rotations. For example, the analysis takes place, in particular, by a ratio of the noise output of ranges of low frequencies or orders to the noise output of ranges of high frequencies or orders.

In other words, measured values of different frequency ranges are recorded to form a characteristic, based on these different measured values The invention makes use of the fact that a sensor power density in the area of low frequencies is not influenced by a deteriorated dynamic of the sensor which has already occurred, while it is influenced in the area of high frequencies. Based on this finding, a corresponding characteristic is formed, which may then be compared with a threshold value stored in a user-defined manner and which is independent of the excitation. One characteristic of a deteriorating dynamic of the sensor may, for example, lie in the fact that the characteristic is smaller than this threshold value. Otherwise, the dynamics of the sensors may be viewed as sufficient for measuring methods of the sensor associated therewith. The characteristic thus ascertained takes into account the different measuring ranges of the sensor, so that a reliable analysis of the dynamics is possible, which also proves to be more robust than previous methods in this field. It is thus possible to make a clear distinction between a sensor which is okay and a sensor which is not okay.

The triggering signal is designed, for example, to trigger further actions in the vehicle. With the aid of the delta possibly ascertained between the characteristic and the threshold, at least one operating state of the sensor may be inferred, this information then being usable for the purpose of an analysis. The triggering signal may additional comprise this information and provide it to a user or the vehicle or any extended analysis peripheral, in particular a connected analysis device, so that an impaired sensor dynamic of the sensor is displayed, an expanded analysis being provided.

In a further exemplary embodiment of the invention, it is provided that a computer program is provided, the computer program running on a control and computing unit of an internal combustion engine of a vehicle. The aforementioned advantages also apply, to the extent transferable, to the described computer program.

In a further exemplary embodiment of the invention, it is provided that a computer program product having program code is provided, which is stored on a machine-readable carrier for carrying out the method when the program is executed on a computer and/or a control unit. The aforementioned advantages also apply, to the extent transferable, to the described computer program product having program code.

In a further exemplary embodiment of the invention, it is provided that a vehicle is provided, which comprises a computer program and/or a computer program product. The aforementioned advantages also apply, to the extent transferable, to the described vehicle.

In a further exemplary embodiment of the invention, it is thus provided that the at least one triggering signal is triggered, in particular, if the calculated characteristic is smaller than the threshold value. If the threshold value is selected in a correspondingly sensitive manner, a particularly fine classification of sensors to be analysis for their dynamics is possible.

It is also provided that the particular measured values are collected over a time interval of 2 ms to 300 ms or 15 ms to 280 ms or 30 ms to 240 ms or during at least one f engine revolution or a maximum of ten engine revolutions.

It is thus possible to ascertain a particular sufficient number of measured values, so that the robust analysis explained above may be carried out particularly reliably.

It is also provided that the sensor is designed to collect measured values in a range of 10 Hertz to 6,000 Hertz. Individual measured values spaced a sufficient distance apart may thus be collected in the relevant frequency ranges in each case in the sense of the idea explained above, to thereby even better facilitate a reliable and robust analysis.

It is additionally provided that the measured values of different frequency ranges differ from each other at least by a factor of 5 in each case. The aforementioned advantages may be even better achieved thereby.

It is provided that, during the calculation of the characteristic, high-frequency measured values, in particular measured values in the measurement interval between 800 Hertz and 6,000 Hertz, are added up and subsequently normalized with at least one low-frequency measured value, in particular a measured value in the measurement interval between 50 Hertz and 300 Hertz.

For example, the particular measured values are recorded in connection with the pressure signals during the engine rotations which set in during operation. The amplitudes are determined, for example for the 20th to 140th order, depending on the engine concept. These amplitudes are correspondingly added up. In addition, the fourth-order amplitude, for example, is determined so that the sum of the higher amplitudes may be normalized correspondingly to these low amplitudes. In other words, the characteristic is calculated in that the sum of the higher amplitudes is divided by the low amplitude. This characteristic is then compared with the stored threshold value. For example, rotational speed-dependent threshold values may be used so that the method may be employed in a particularly user-friendly and flexible manner at this point, due to the threshold values settable by the user. If the value of the characteristic is, for example, smaller than the threshold, the sensor is not okay, and at least one triggering signal is therefore triggered.

It is also provided that the particular measured values are transformed into the frequency domain with the aid of an FFT method prior to calculating the characteristic. The aforementioned advantages may be even better achieved thereby.

It is also provided that the particular measured values are transformed into the frequency domain with the aid of an FFT method, in particular with the aid of a Goertzel method, prior to calculating the characteristic.

The aforementioned advantages may be even better achieved thereby.

It is also provided that the sensor is designed to be used in a camshaft adaptation method.

The described method is particularly suitable for this application. Since a basic requirement regarding the camshaft adaptation method lies in a sufficiently reliable dynamic of the sensors involved, the described method may be particularly advantageously used in this connection.

It is additionally provided that the control and computing unit is designed to at least partially carry out tasks of an engine controller, or the control and computing unit being coupled with an engine controller of the vehicle.

The analysis carried out and the results obtained may thus be actively used for processes of the engine controller. In other words, the information about a detected defective sensor may be used directly for corrective intervention into the engine controller.

It is also provided that the triggering signal is used for further calculation and/or control processes in the vehicle.

The analysis carried out and the results obtained may thus be actively used for further calculation and/or control processes in the vehicle. In other words, the information about a detected defective sensor may be used directly for corrective intervention in the vehicle.

It is also provided that the triggering signal is displayed in at least one output apparatus of the vehicle, in particular on at least one screen apparatus of the vehicle. In this way, a driver is reliably notified, so that he/she may then initiate corresponding measures to replace or repair the detected defective sensor.

The components of the present invention explained above are applicable, for example, in any vehicles which include internal combustion engines, in particular gasoline engines, which require a highly dynamic sensor to use, for example, the camshaft adaptation method.

The different examples of the invention mentioned in this application may be advantageously combined with each other unless otherwise indicated in the individual case.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
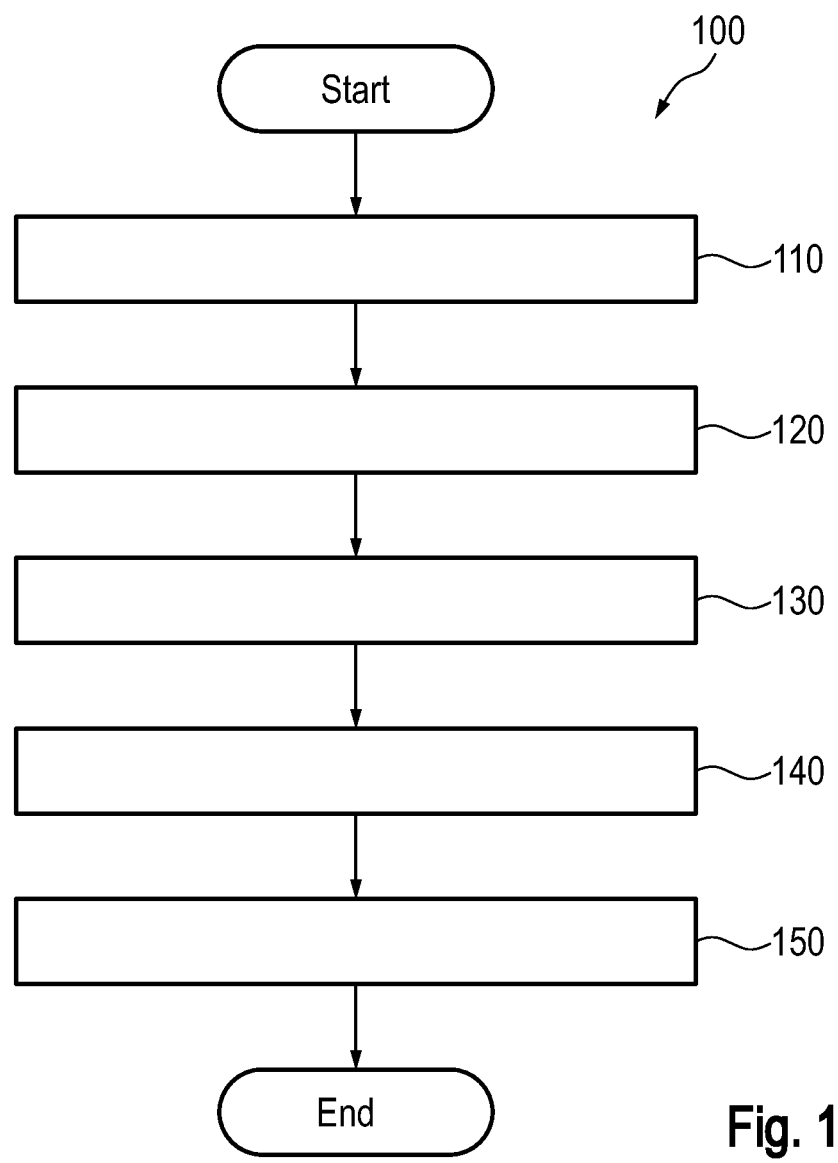
FIG. 1 shows a method flowchart of a method for diagnosing the dynamics of a sensor in the fresh air or exhaust gas tract of internal combustion engines.

FIG. 1 shows a method flowchart 100 of a method for diagnosing the dynamics of a sensor in the fresh air or exhaust gas tract of internal combustion engines. In a first method step 110, a sensor for measuring a pressure signal in the fresh air or exhaust gas tract of an internal combustion engine of a vehicle is coupled with a control and computing unit. In a second method step 120, at least one measured value of different frequency ranges, collected with the aid of the sensor, is transmitted in each case to the control and computing unit. In a third method step 130, a characteristic is calculated, using the measured values of different frequency ranges. In a fourth method step 140, the calculated characteristic is compared with a threshold value stored in a user-defined manner in the control and computing unit. In a fifth method step 150, at least one triggering signal is triggered if the calculated characteristic deviates from the threshold value, so that an impaired sensor dynamic of the sensor is displayed.

Instead of discrete orders, the frequency range may also be used, as is common for an application of an FFT method. A normalizing step may also be completed during the calculation. Alternatively, any method may be used, with the aid of which the spectral power density is obtained. Other spectral components of the characteristic sensor power density may also be used. The threshold for detecting a sensor which is not okay may have other dependencies. In a combustion engine or an internal combustion engine, the relevant frequency range changes, depending on the engine rotational speed. Accordingly, the orders are used as multiples of the fundamental frequency (engine rotational speed). The amplitude has proven to be the most suitable spectral component for the necessary requirements.

The described method may also be referred to as a diagnosis of the sensor dynamic by calculating the noise output.

Figure 2:
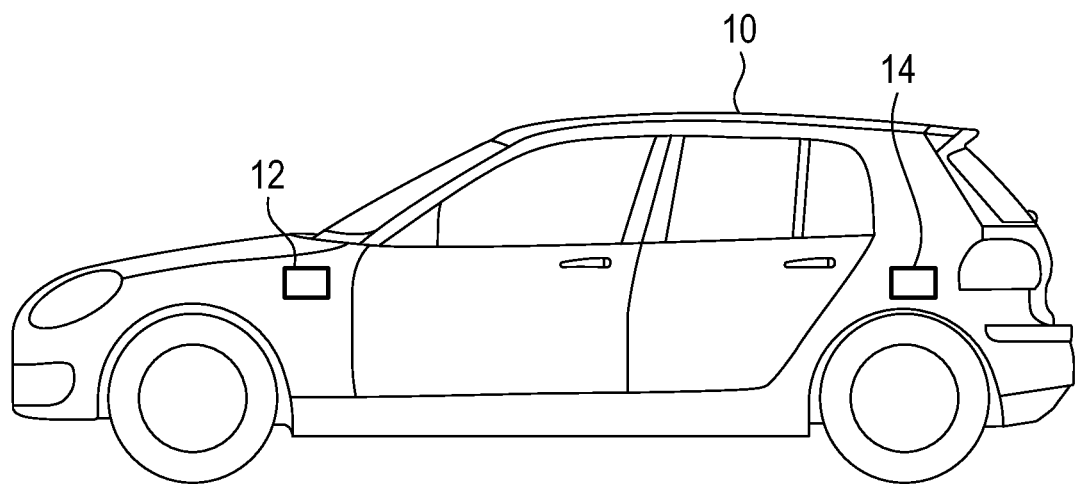
FIG. 2 shows a schematic representation of a vehicle comprising a computer program and a computer program product.

FIG. 2 shows a schematic representation of a vehicle 10 comprising a computer program 12 and a computer program product 14. It is conceivable that the illustrated vehicle comprises either the computer program or the computer program product.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for diagnosing dynamics of a sensor in a fresh air or exhaust gas tract of an internal combustion engine, the method comprising:

coupling a sensor for measuring a pressure signal in the fresh air or exhaust gas tract of the internal combustion engine of a vehicle with a control and computing unit;

transmitting measured values, collected with the aid of the sensor at differing frequency ranges, to the control and computing unit;

calculating a characteristic using the measured values collected at the differing frequency ranges;

comparing the calculated characteristic with a threshold value stored in a user-defined manner in the control and computing unit; and triggering a least one triggering signal if the calculated characteristic deviates from the threshold value so that an impaired sensor dynamic of the sensor is displayed.

2. The method according to claim 1, wherein the at least one triggering signal is triggered if the calculated characteristic is smaller than the threshold value.

3. The method according to claim 1, wherein the measured values are collected over a time interval of 2 ms to 300 ms, 15 ms to 280 ms, 30 ms to 240 ms, during at least one engine revolution or during a maximum of ten engine revolutions.

4. The method according to claim 1, wherein the sensor is designed to collect the measured values in the range of 10 Hertz to 6,000 Hertz.

5. The method according to claim 1, wherein the measured values collected at the differing frequency ranges each differ at least by a factor of five.

6. The method according to claim 1, wherein, during the calculation of the characteristic, high-frequency measured values, in the measurement interval between 800 Hertz and 6,000 Hertz, are added up and subsequently normalized with at least one low-frequency measured value that is in the measurement interval between 50 Hertz and 300 Hertz.

7. The method according to claim 1, wherein the measured values are transformed into a frequency domain with the aid of an FFT method prior to calculating the characteristic.

8. The method according to claim 1, wherein the FFT method is a Goertzel method.

9. The method according to claim 1, wherein the sensor is designed to be used in a camshaft adaptation method.

10. The method according to claim 1, wherein the control and computing unit is designed to at least partially carry out tasks of an engine controller, or the control and computing unit is coupled with an engine controller of the vehicle.

11. The method according to claim 1, wherein the triggering signal is used for further calculation and control processes in the vehicle.

12. The method according to claim 1, wherein the triggering signal is displayed in at least one output apparatus of the vehicle or on at least one screen apparatus of the vehicle.

13. A non-transitory computer-readable medium storing a computer program product having program code thereon that, when executed on a computer, causes the computer to carry out the method according to claim 1.

14. A vehicle comprising the computer-readable medium storing the computer program product according to claim 13.

* * * * *